United States Patent
Onishi et al.

(10) Patent No.: US 11,158,908 B2
(45) Date of Patent: Oct. 26, 2021

(54) SEPARATOR FOR LEAD ACID STORAGE BATTERY

(71) Applicant: Nippon Sheet Glass Company, Limited, Tokyo (JP)

(72) Inventors: Masaki Onishi, Tokyo (JP); Takashi Shidomi, Tokyo (JP); Masahiro Kawachi, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 115 days.

(21) Appl. No.: 16/606,710

(22) PCT Filed: Apr. 27, 2018

(86) PCT No.: PCT/JP2018/017246
§ 371 (c)(1),
(2) Date: Oct. 18, 2019

(87) PCT Pub. No.: WO2018/199300
PCT Pub. Date: Nov. 1, 2018

(65) Prior Publication Data
US 2020/0136117 A1    Apr. 30, 2020

(30) Foreign Application Priority Data

Apr. 28, 2017  (JP) .............................. JP2017-090014

(51) Int. Cl.
*H01M 50/00*    (2021.01)
*H01M 50/463*   (2021.01)
*H01M 10/06*    (2006.01)

(52) U.S. Cl.
CPC ......... *H01M 50/463* (2021.01); *H01M 10/06* (2013.01)

(58) Field of Classification Search
CPC ...... H01M 10/06; H01M 50/463; Y02E 60/10
See application file for complete search history.

(56) References Cited

U.S. PATENT DOCUMENTS

| | | |
|---|---|---|
| 5,985,484 A | 11/1999 | Young |
| 6,132,899 A | 10/2000 | Young |

(Continued)

FOREIGN PATENT DOCUMENTS

| | | |
|---|---|---|
| EP | 3642893 A1 | 4/2020 |
| EP | 3706200 A1 | 9/2020 |

(Continued)

OTHER PUBLICATIONS

Extended European Search Report for European Application No. 18789980.2 dated Nov. 11, 2020 (8 sheets).

(Continued)

*Primary Examiner* — Cynthia H Kelly
*Assistant Examiner* — Monique M Wills
(74) *Attorney, Agent, or Firm* — Kratz, Quintos & Hanson, LLP (57) ABSTRACT

[Problem]
A separator for a lead acid storage battery that is prevented from suffering the puncture of a separator formed of a microporous film is to be provided.
[Solution]
The separator includes: a microporous film having a thickness of from 0.1 to 0.3 mm as a base portion 3; plural main ribs 2a that are provided on one surface 3a of the base portion 3; and plural miniature ribs 2b that have a lower height than a height of the main ribs 2a and are provided on the other surface 3b of the base portion 3, and the plural miniature ribs 2b are provided in a linear form with an inter-rib distance P, which is a distance between facing surfaces of the adjacent miniature ribs 2b, of less than 1.9 mm.

5 Claims, 3 Drawing Sheets

(56) References Cited

U.S. PATENT DOCUMENTS

| | | |
|---|---|---|
| 6,410,183 B2 | 6/2002 | Weerts |
| 9,935,302 B2 | 4/2018 | Miller |
| 2002/0004166 A1 | 1/2002 | Weerts |
| 2011/0091761 A1 | 4/2011 | Miller |
| 2012/0070714 A1 | 3/2012 | Chambers |
| 2015/0188111 A1* | 7/2015 | Whear ............... H01M 50/449 |
| | | 429/143 |
| 2018/0175352 A1 | 6/2018 | Miller |
| 2018/0366710 A1 | 12/2018 | Whear |

FOREIGN PATENT DOCUMENTS

| | | |
|---|---|---|
| JP | 2006-156060 A | 6/2006 |
| JP | 2013-508917 A | 3/2013 |

OTHER PUBLICATIONS

International Search Report for International Application No. PCT/JP2018/017246 dated Aug. 7, 2018 (3 sheets, 1 sheet translation, 4 sheets total).

* cited by examiner

SEPARATOR FOR LEAD ACID STORAGE BATTERY

TECHNICAL FIELD

The present invention relates to a separator for a lead acid storage battery, the separator being formed of a ribbed microporous film having plural ribs provided with prescribed intervals.

BACKGROUND ART

In these days, the enhancement of the battery capabilities of lead acid batteries (including the enhancement of the high output power and the high efficiency discharge capability thereof) is being demanded. For addressing the demand, the increase of the number of sheets of the electrode plates and the decrease of the distance between the electrode plates are demanded, and the thinning of the electrode plate and also the thinning of the separator are demanded. As for a polyethylene separator (see, for example, PTL 1), for example, the separator is demanded to be thinner by decreasing the thickness of the base portion thereof except for the rib height to 0.25 mm or less.

The polyethylene separator is constituted as a part of an electrode group by processing into a bag enclosing a positive electrode plate or a negative electrode plate. The polyethylene separator may be used with an electrode plate using an inexpensive expanded metal grating in some cases. The electrode plate may have a protrusion of a lead bar that is in a free state (exposed state) at the edge of the electrode plate in some cases. Since the electrode group receives a compression force in the thickness direction thereof, the protrusion strongly thrusts the separator to puncture the separator in some cases. This may be a cause of short circuit. In particular, in the case where the protrusion of a lead bar is in contact with the flat surface of the separator, which is the opposite surface to the main ribbed surface (which is the surface on the side where main ribs are provided among the front and back surfaces) in the structure of the electrode group, the protrusion tends to thrust and puncture the separator. In the case where the protrusion of a lead bar is in contact with the main ribbed surface of the separator, on the other hand, the strong thrust of the protrusion of a lead bar onto the base surface of the separator is liberalized by the height of the main ribs, so as to prevent the separator from being punctured. Specifically, the distance between the surface of the electrode plate and the base surface of the separator is increased by the distance corresponding to the height of the main ribs, and therefore even though the protrusion of a lead bar extends from the surface of the electrode, the protrusion hardly reaches the base surface of the separator.

CITATION LIST

Patent Literature

PTL 1: JP-A-02-155161

SUMMARY OF INVENTION

Technical Problem

The decrease of the thickness of the base portion of the polyethylene separator to 0.25 mm or less, i.e., the further thinning thereof, may facilitate the puncture of the separator (i.e., the reduction in puncture strength) due to the thrust effect with the protrusion of a lead bar at the edge of the electrode plate, thereby facilitating the occurrence of short circuit.

For redeeming the reduction in puncture strength of the polyethylene separator, such measures (concepts) have been taken as the use of a hard resin, a stretching treatment performed, and the reduction of the porosity.

An object of the separator for a lead acid storage battery of the invention is to provide a separator for a lead acid storage battery that is prevented from suffering the puncture of a separator formed of a microporous film, by an approach different from the aforementioned measures.

Solution to Problem

The separator for a lead acid storage battery of the invention solves the problem by a measure of providing miniature ribs capable of suppressing the puncture of the separator, on the flat surface, which is the opposite surface to the main ribbed surface among the both surfaces of the separator, tending to suffer the puncture due to the contact with the protrusion of a lead bar.

For solving the problem, the separator for a lead acid storage battery of the invention includes: a microporous film having a thickness of from 0.1 to 0.3 mm as a base portion; plural main ribs that are provided on one surface of the base portion; and plural miniature ribs that have a lower height than a height of the main ribs and are provided on the other surface of the base portion, the plural miniature ribs being provided in a linear form with an inter-rib distance, which is a distance between facing surfaces of the adjacent ribs, of less than 1.9 mm.

Advantageous Effects of Invention

The separator for a lead acid storage battery of the present invention has an enhanced puncture strength to make short circuit less likely to occur.

DESCRIPTION OF EMBODIMENTS

Embodiments of the separator for a lead acid storage battery of the invention will be described, but the separator for a lead acid storage battery of the invention is not limited to the embodiments shown below.

Figure 1:
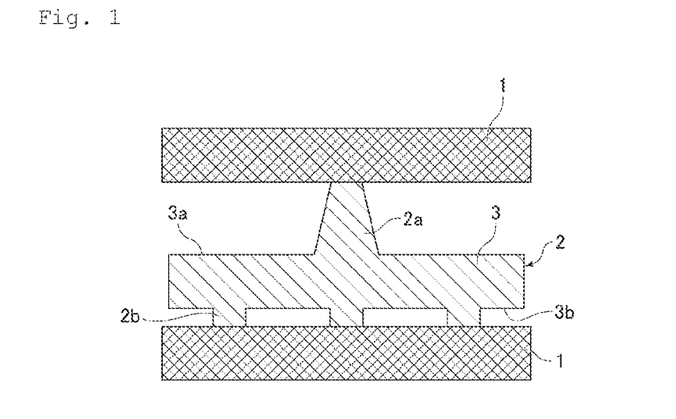
FIG. 1 is an explanatory view showing a schematic concept of electrode plates and a separator constituting an electrode group of a liquid lead acid storage battery.
Figure 2:
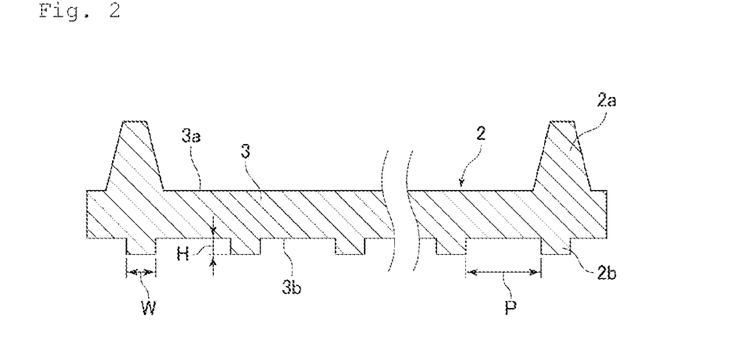
FIG. 2 is an explanatory view showing one example of a cross sectional shape of a separator.

FIG. 1 is an explanatory view showing a schematic concept of electrode plates 1 and a separator 2 constituting an electrode group of a liquid lead acid storage battery. FIG. 2 is an explanatory view showing one example of a cross sectional shape of a separator 2.

The separator 2 is, for example, a polyethylene separator, which may be processed into a bag enclosing the electrode plates 1 including a positive electrode plate and a negative electrode plate stacked alternately. The plural electrode plates 1 enclosed by the separator 2 constitute an electrode group, which is housed in a battery jar along with an electrolyte.

The separator 2 has a base portion 3, main ribs 2a, and miniature ribs 2b. The base portion 3 is a flat thin sheet, which is a microporous film. The base portion 3 has a thickness of 0.1 mm or more and 0.3 mm or less, and preferably 0.15 mm or more and 0.25 mm or less.

The main ribs 2a are plural ribs in a linear form that are provided on the main rib surface 3a as one surface of the base portion 3, protruding substantially perpendicularly from the main rib surface 3a. The main ribs 2a secure a constant distance between the positive plate (electrode plate 1) and the separator 2, so as to provide an effect of preventing the base portion 3 from being brought into direct contact with the surface of the positive plate to suppressing corrosion thereof due to oxidation, an effect of facilitating escape of gas generating in charging, an effect of securing a large amount of the electrolyte capable of freely flowing, and the like. The main ribs 2a may have any known embodiment, as far as these objects can be achieved.

The miniature ribs 2b are plural ribs in a linear form that are provided on the miniature rib surface 3b as the surface opposite to the main rib surface 3a (i.e., the other surface) of the base portion 3, protruding substantially perpendicularly from the miniature rib surface 3b. The miniature ribs 2b are provided for the purpose of preventing the base portion 3 from being brought into contact with the protrusion of a lead bar (described later) formed at the edge of the electrode plate 1.

The miniature ribs 2b are provided over the entire surface of the miniature rib surface 3b. The miniature ribs 2b may be provided on a part of the miniature rib surface 3b, for example, on a region with a high existence frequency of the protrusion of a lead bar on the electrode plate 1. Accordingly, the separator 2 can be prevented more efficiently from suffering the puncture.

The miniature ribs 2b are provided in a linear form in the direction that is perpendicular, in parallel, or diagonally to the flow direction of the sheet in the compression molding in the production of the microporous film. The miniature ribs 2b are preferably provided in the direction that is in parallel to the flow direction of the sheet in view of the easiness in filling a resin in the compression molding. In the case where the miniature ribs 2b are provided in the direction that is in parallel to the flow direction of the sheet, the miniature ribs 2b are generally consequently disposed in the vertical direction (longitudinal direction) at the time of installation of the battery. Accordingly, the separator 2 may also have an effect of facilitating the escape of bubbles formed from the electrode plate of the battery through a charge and discharge reaction.

In the case where the miniature ribs 2b have an inclination to the flow direction of the sheet (longitudinal direction), the inclination angle is preferably 300 or less. Accordingly, the miniature ribs 2b are oriented in the substantially vertical direction in the constitution of the electrode group of the lead acid storage battery, and gaps penetrating in the vertical direction are formed between the electrode plates 1. Accordingly, bubbles formed from the electrode plates 1 can readily escape upward, and the increase of the electric resistance due to accumulation of bubbles can be suppressed.

The miniature rib 2b has a rectangular shape as for the cross sectional shape perpendicular to the linear direction of the miniature rib 2b. The cross sectional shape preferably has a rib width W of from 0.1 to 1.0 mm, and preferably 0.5 mm or less. In the case where the rib width W is larger than 1.0 mm, the occupied area of the miniature ribs 2b on the miniature rib surface 3b is increased, and the thickness of the separator 2 is substantially increased. Accordingly, the electric resistance of the separator may be increased. Therefore, the rib width W is preferably decreased as much as possible within the range that secures the enhancement of the puncture strength. In the case where the rib width W is less than 0.1 mm, it may be difficult to place the resin uniformly into grooves of a mold for molding the miniature ribs.

The miniature rib 2b has a rib height H that is lower than the height of the main rib 2a, and is preferably, for example, from 0.05 to 0.20 mm. The rib height H that is higher than the height of the main rib 2a is not preferred since the height of the main rib 2a is relatively low, and the intended function of the main rib cannot be sufficiently exhibited. The height H of the miniature rib 2b that is less than 0.05 mm is not preferred since it may be difficult to provide the function that the protrusion of a lead bar protruded from the electrode plate 1 is prevented from being brought into direct contact with the base portion 3, but is brought into contact with the miniature rib 2b.

The miniature ribs 2b are formed to make a distance between the facing surfaces of the adjacent miniature ribs 2b (which may be hereinafter referred simply to as an "inter-rib distance P") of less than 1.9 mm (0.075 in), and preferably 1.0 mm or less. The inter-rib distance P can be rephrased as the width of the base portion 3 formed between the adjacent miniature ribs 2b, and the base portion 3 exposed on the miniature rib surface 3b is formed to have a width of less than 1.9 mm.

With the decrease of the inter-rib distance P, the occupied area of the miniature ribs 2b on the miniature rib surface 3b is increased, and the thickness of the separator 2 is substantially increased. Accordingly, the electric resistance of the separator 2 may be increased. Therefore, the inter-rib distance P is preferably large as much as possible within the range that secures the enhancement of the puncture strength. For example, the inter-rib distance P is preferably 0.2 mm or more, more preferably 0.45 mm or more, and further preferably 0.5 mm or more.

A polyethylene separator may be used with an electrode plate formed of an inexpensive expanded metal grating to constitute an electrode group in some cases. The electrode plate may have a protrusion of a lead bar that is in a free state at the edge of the electrode plate in some cases.

Figure 3:
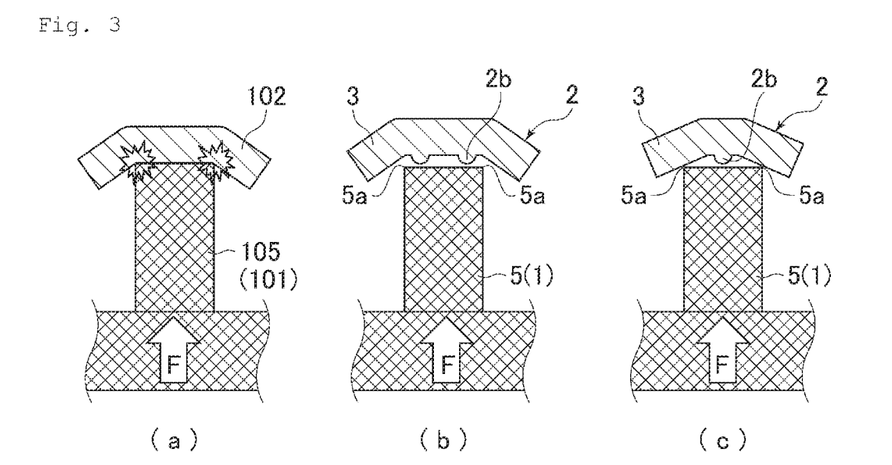
FIG. 3 is an illustration for explaining the relationship between a separator and a protrusion of a lead bar of an electrode plate.

For example, FIG. 3 is an illustration explaining the relationship between the separator and the protrusion of a lead bar. As shown in FIG. 3(a), an electrode group (electrode plate 101) receives a compression force F in the thickness direction thereof, and therefore the protrusion of the lead bar 105 strongly thrusts the separator 102 to puncture the separator 102 in some cases. This may be a cause of short circuit of the electrode group.

On the other hand, the separator 2 that has miniature ribs 2b in the present embodiment can improve the puncture strength more effectively than the simple increase of the thickness of the base portion 3. Specifically, as shown in FIGS. 3(b) and 3(c), the distance between the lead bar 5 and the base portion 3 is secured by the miniature ribs 2b, and thereby the stress concentration in the case where edge portions 5a (protrusions) of the lead bar 5, which may become the starting points of breakage of the resin, pierce the separator 2 can be relaxed. In other words, the protrusion of the lead bar 5 can be prevented from strongly thrusting directly the base portion 3. Consequently, in the structure where the electrode group receives the compression force F, the protrusion of the lead bar 5 can be prevented from being brought into direct contact with the base portion 3, but can be brought into contact with the miniature ribs 2b provided uniformly on the base portion 3.

The lead bar 5 generally has a diameter of approximately from 1.9 to 2.0 mm. The inter-rib distance P is less than 1.9 mm as described above. Accordingly, the miniature ribs 2b can have a function preventing the protrusion of the lead bar 5 formed on the electrode plate 1 from being brought into direct contact with the base portion 3 of the separator 2. With an inter-rib distance P of less than 0.95 mm, the effect can be enhanced since the protrusion of the lead bar 5 is brought into contact with two or more miniature ribs 2b simultaneously, as shown in FIG. 3(b).

As one index showing the puncture strength of the separator 2, the following value may be used. Specifically, at the time when the miniature rib surface 3b is pierced perpendicularly with a needle having a tip surface having a diameter of 1.9 mm, the probability of contacting the needle tip with the miniature rib (which may be hereinafter referred simply to as a "contact probability") is obtained for the cross sectional shape perpendicular to the linear direction of the miniature rib, and designated as an index contributing the puncture strength of the separator 2. In other words, in the case where the contact width of the needle to the miniature rib 2b is changed while repeatedly increasing and decreasing at a constant cycle, the contact probability is the proportion of the width of the miniature rib 2b that is brought into contact with the needle. The proportion is determined from the width of the miniature rib 2b that is brought into contact with the needle while the needle moves for one cycle of the cycle, and the width of the needle. The contact probability can also be used as an index showing the extent of suppressing the protrusion of the lead bar 5 from being brought into direct contact with the base portion 3 of the separator 2.

The diameter of the needle of 1.9 mm is determined according to the dimension of the needle used in the puncture resistance test defined in BCI Battery Technical Manual, BCIS-03B, of Battery Council International, which is the U.S. battery standard. The contact probability can be calculated, for example, in the following manner.

Figure 4:
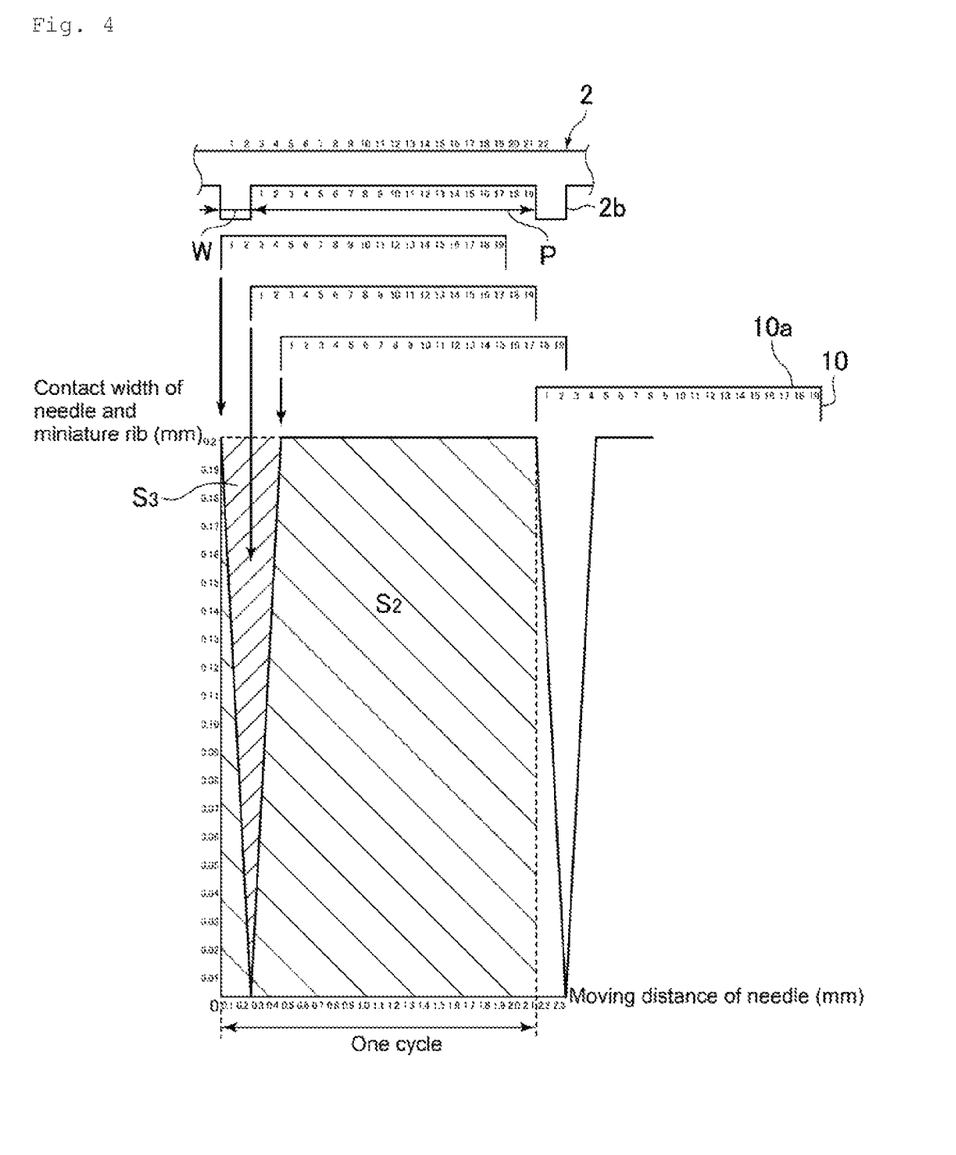
FIG. 4 is an explanatory illustration for explaining the probability of contacting a tip surface of a needle with a miniature rib.

FIG. 4 is an explanatory illustration for explaining the probability of contacting a tip surface 10a of the needle 10 with the miniature rib 2b. FIG. 4 shows the example where the rib width W is 0.2 mm, and the inter-rib distance P is 1.90 mm.

Firstly, a graph is obtained with the moving distance (mm) of the needle 10 along the direction of the inter-rib distance P as the abscissa axis, and the width (mm) where the tip surface 10a of the moving needle 10 (which may be hereinafter referred simply to as a "needle 10") and the miniature rib 2b are brought into contact with each other as the ordinate axis. As shown in FIG. 4, the contact width of the miniature rib 2b and the needle 10 is changed while repeatedly increasing and decreasing at a constant cycle with the minimum value of 0 mm and the maximum value of 0.2 mm.

Subsequently, an area $S_1$ of the graph drawn with the assumption that the miniature rib 2b and the needle 10 are always brought into contact with each other, and an area $S_2$ of the graph of the state where the miniature rib 2b is actually brought into contact with the needle 10 are obtained for one cycle.

In the example shown in FIG. 4, the area $S_1$ and the area $S_2$ are obtained as follows.

$$\text{area } S_1(\text{area } S_2+\text{area } S_3)=(\text{width: moving distance per one cycle 2.1})\times(\text{length: width of miniature rib 0.2})=0.42$$

$$\text{area } S_2=\text{area } S_1-\text{area } S_3=0.42-(0.4\times0.20/2)=0.38$$

The ratio of the area $S_2$ in the area $S_1$ is obtained as the ratio $A_L$ of the width of the miniature rib 2b that is in contact with the needle 10. Specifically, the ratio $A_L$ is obtained by the following expression.

$$\text{ratio } A_L=\text{area } S_2/\text{area } S_1 \quad (1)$$

In the example shown in FIG. 4, the ratio $A_L$ is obtained as follows.

$$\text{ratio } A_L=0.38/0.42=0.905$$

Subsequently, in the case where the separator 2 is pierced with the needle 10, the contact probability $A_p$ that is the probability of contacting the needle 10 with the miniature rib 2b is obtained from the ratio of the width of the miniature rib 2b that is brought into contact with the needle 10 moving in one cycle, and the width $W_p$ of the needle 10. Specifically, the contact probability $A_p$ is obtained by the following expression.

$$\text{contact probability } A_p (\%)=(\text{width } W_L \text{ of miniature rib}\times\text{ratio } A_L)/\text{width } W_p \text{ of needle}\times100 \quad (2)$$

In the example shown in FIG. 4, the contact probability $A_p$ is obtained as follows.

$$\text{contact probability } A_p=(0.2\times0.905)/1.90\times100=9.53\%$$

The contact probability $A_p$ obtained in the aforementioned manner is preferably 10% or more and 30% or less. The puncture strength may be insufficient in the case where the contact probability $A_p$ is less than 10% as in FIG. 4 where the width $W_p$ of the needle is the same as the inter-rib distance P. In the case where the contact probability $A_p$ exceeds 30%, the impregnation of the separator 2 with an electrolyte may be insufficient, which may cause a risk of increase in electric resistance.

The aforementioned miniature rib 2b is one example, and there is no limitation, as far as the prescribed puncture strength is provided.

For example, the miniature ribs 2b may include a combination of plural linear miniature ribs that are different in the direction. In this case, the miniature ribs 2b may be formed in a lattice form or a crossed form. In the case where the probability of the presence of the miniature ribs with an interval of 1.9 mm is the same, and the interval between the adjacent miniature ribs 2b is less than 1.9 mm, a puncture strength that is equivalent to that in the case where plural miniature ribs 2b extending in the same direction are formed can be obtained.

The miniature ribs 2b are not limited to a continuous linear form, and may be in the form of an interrupted line. By multiplying the probability of the presence of the miniature ribs 2b in the form of an interrupted line (for example, 80% for 1 mm of an interrupted line in 5 mm) by the probability of the presence of the miniature ribs with an interval of 1.9 mm calculated in the portion having the miniature ribs 2b present, a puncture strength that is equivalent to that of the continuous linear miniature ribs 2b that has the same probability of the presence of the miniature ribs can be obtained.

Figure 5:
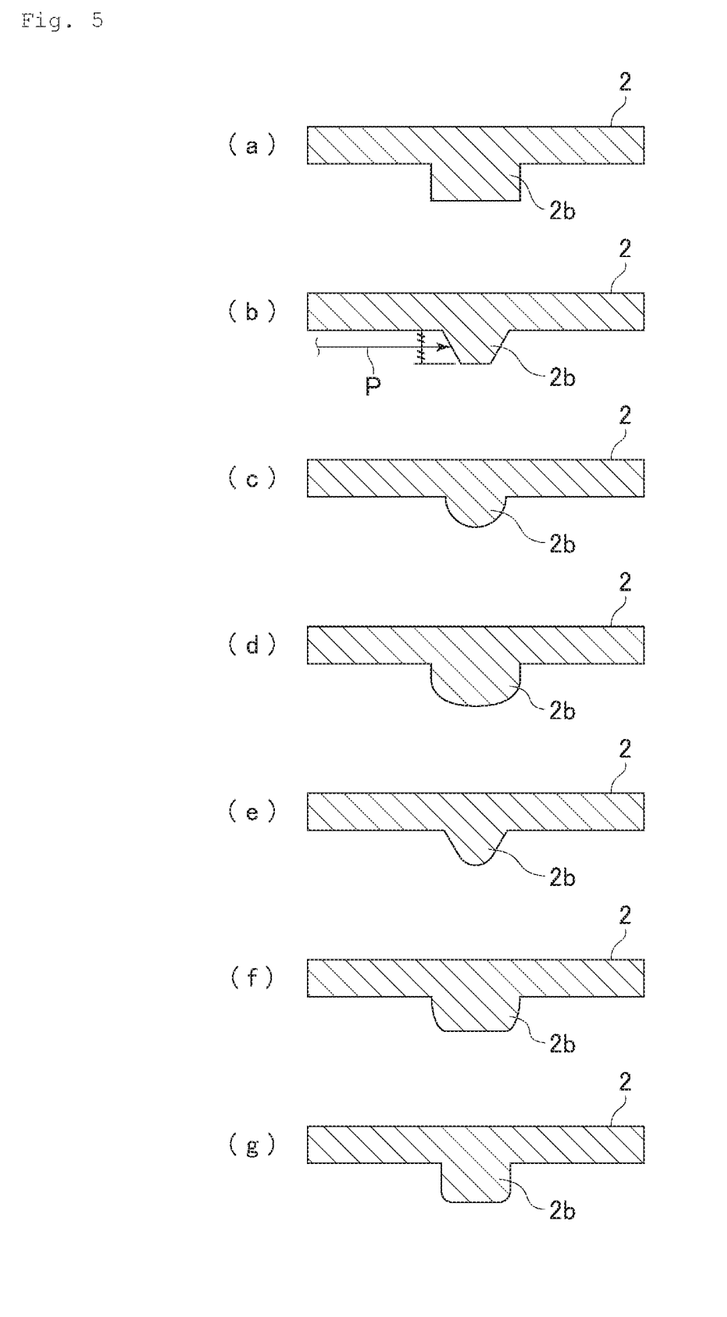
FIG. 5 is an explanatory illustration showing various examples of cross sectional shapes of a miniature rib.

The cross sectional shape of the miniature rib 2b is not limited to a rectangular shape. FIG. 5 is an explanatory illustration showing various examples of the cross sectional shapes of the miniature rib 2b.

The cross sectional shape of the miniature rib 2b may be a rectangular shape having a width smaller than a height shown in FIG. 5(a), a trapezoidal shape shown in FIG. 5(b), a semicircular shape shown in FIG. 5(c), or a rectangular shape with a dome-shaped top surface shown in FIG. 5(d). The cross sectional shape may also be a dome-like trapezoidal shape with a dome-shaped top surface shown in FIG. 5(e), a trapezoidal shape with curved edges in the height direction shown in FIG. 5(f), or a rectangular shape with chamfered corners of the top surface shown in FIG. 5(g). In consideration of the easiness in placing the resin into the grooves of the mold for molding the miniature ribs, a rectangular shape, a trapezoidal shape, a semicircular shape, and a combination thereof are preferred.

In the case where the miniature ribs 2b have a cross sectional shape having an inter-rib distance P that is not constant in the height H direction thereof (for example, the trapezoidal shape shown in FIG. 5(b)), the inter-rib distance P is defined as the distance between the facing surfaces of the adjacent miniature ribs 2b at half the rib height H (see, for example, FIG. 5(b)). Accordingly, the same improvement effect of the puncture strength can be obtained as that of the rectangular miniature ribs having a constant rib height H with the same inter-rib distance P.

In the case where the miniature ribs 2b include plural miniature ribs that are different in the rib height H, it is preferred that the average value of the rib heights H of the miniature ribs 2b has a rib height H that is lower than the height of the main ribs 2a as described above, and the average value is, for example, from 0.02 to 0.20 mm. A puncture strength that is equivalent to that of the linear miniature ribs having a uniform height can be obtained. In the case where the heights H of the adjacent miniature ribs 2b are different from each other, the distance between the facing surfaces at half the rib height H of the lower miniature rib 2b is designated as the inter-rib distance P.

In the separator 2 for a lead acid storage battery according to the present embodiment described above, the linear miniature ribs 2b having a lower height than the main ribs 2a are formed on the miniature rib surface 3b that is opposite to the main rib surface 3a having the main ribs 2a formed thereon of the thin sheet formed of a microporous film. Accordingly, in the structure of the electrode group, the protrusion of the lead bar 5 can be prevented from strongly thrusting directly the base portion 3 of the separator 2. Specifically, in the structure where the electrode group receives the compression force, the protrusion of the lead bar is brought into contact with the miniature ribs 2b provided uniformly on the miniature rib surface 3b of the base portion 3, before the direct contact with the base portion 3 of the separator 2, and thereby the protrusion of the lead bar is prevented from being brought into direct contact with the base portion 3. Accordingly, the effect of preventing the protrusion of the lead bar from strongly thrusting the separator 2 and suppressing the protrusion from puncturing the separator 2 can be exhibited. Consequently, the separator 2 for a lead acid storage battery is enhanced (improved) in puncture strength, so as to make short circuit less likely to occur.

EXAMPLES

Examples of the separator for a lead acid storage battery of the present invention will be described in detail along with comparative examples.

Example 1

30 parts by mass of ultrahigh molecular weight polyethylene resin powder having a weight average molecular weight of 5,000,000 as a thermoplastic resin, 70 parts by mass of silica fine powder having an average particle diameter of 15 μm as inorganic powder, a paraffin oil as one kind of a mineral oil as a plasticizer were mixed with a mixer. The resulting mixture under melt-kneading with heat was extruded through a T-die into a sheet form from a twin screw extruder, and subjected to compression molding by passing through one pair of molding rolls including rolls having grooves corresponding to rib patterns of both surfaces. Accordingly, a nonporous film was produced that had, on one surface of the sheet, main ribs having the prescribed linear shape in the flow direction of the sheet to be brought into contact with an electrode plate, and on the opposite surface thereof, miniature ribs having the prescribed linear shape in the flow direction of the sheet integrally formed. Subsequently, the continuous nonporous film was passed in an immersed state in a liquid bath of n-hexane as an organic solvent, and thereby the paraffin oil was extracted except for a part thereof. The film was passed through a drying furnace, so as to produce a microporous film having a total thickness of 0.70 mm and a base portion thickness of 0.20 mm.

The main ribs had a trapezoidal cross sectional shape perpendicular to the linear direction of the main ribs. The main ribs had a main rib height of 0.30 mm, a bottom width of the main ribs of 0.80 mm, and an inter-rib distance of the main ribs of 10.0 mm. The bottom width of the main ribs is the width of the base end, from which the main rib upstands from the base portion. The inter-rib distance of the main ribs is the distance between the facing surfaces of the adjacent main ribs. The miniature ribs had a rectangular cross sectional shape perpendicular to the linear direction of the miniature ribs. The miniature ribs had a miniature rib height of 0.20 mm, an inter-rib distance of the miniature ribs of 0.53 mm, and a miniature rib width of 0.10 mm. The contact probability was 15%.

Example 2

A separator was produced in the same manner as in Example 1 except that the base portion thickness was 0.25 mm, and the main rib height was 0.25 mm to make a total thickness of 0.70 mm.

Example 3

A separator was produced in the same manner as in Example 1 except that the base portion thickness was 0.15 mm, and the main rib height was 0.35 mm to make a total thickness of 0.70 mm.

Example 4

A separator was produced in the same manner as in Example 1 except that the linear direction of the miniature ribs was perpendicular to the direction of the miniature ribs in Example 1.

Example 5

A separator was produced in the same manner as in Example 1 except that the miniature rib width was 0.20 mm, and the inter-rib distance of the miniature ribs was 1.06 mm. The contact probability was 15%.

Example 6

A separator was produced in the same manner as in Example 3 except that the inter-rib distance of the miniature ribs was 1.70 mm, and the miniature rib width was 0.20 mm. The contact probability was 10%.

Example 7

A separator was produced in the same manner as in Example 6 except that the linear direction of the miniature ribs was perpendicular to the direction of the miniature ribs in Example 6.

Example 8

A separator was produced in the same manner as in Example 6 except that the miniature rib height was 0.10 mm, and the main rib height was 0.45 mm to make a total thickness of 0.70 mm.

Example 9

A separator was produced in the same manner as in Example 6 except that the miniature rib height was 0.05 mm, and the main rib height was 0.50 mm to make a total thickness of 0.70 mm.

Example 10

A separator was produced in the same manner as in Example 5 except that the inter-rib distance of the miniature ribs was 0.44 mm. The contact probability was 30%.

Example 11

A separator was produced in the same manner as in Example 10 except that the base portion thickness was 0.25 mm, and the main rib height was 0.25 mm to make a total thickness of 0.70 mm.

Example 12

A separator was produced in the same manner as in Example 10 except that the base portion thickness was 0.15 mm, and the main rib height was 0.35 mm to make a total thickness of 0.70 mm.

Comparative Example 1

A separator was produced in the same manner as in Example 1 except that miniature ribs were not provided, and the main rib height was 0.50 mm to make a total thickness of 0.70 mm.

Comparative Example 2

A separator was produced in the same manner as in Example 1 except that miniature ribs were not provided, the base portion thickness was 0.25 mm, and the main rib height was 0.45 mm to make a total thickness of 0.70 mm.

Comparative Example 3

A separator was produced in the same manner as in Example 1 except that miniature ribs were not provided, the base portion thickness was 0.15 mm, and the main rib height was 0.55 mm to make a total thickness of 0.70 mm.

Comparative Example 4

A separator was produced in the same manner as in Example 6 except that the miniature rib height was 0.02 mm, and the main rib height was 0.53 mm to make a total thickness of 0.70 mm.

Comparative Example 5

A separator was produced in the same manner as in Example 9 except that the base portion thickness was 0.13 mm, and the main rib height was 0.52 mm to make a total thickness of 0.70 mm.

Comparative Example 6

A separator was produced in the same manner as in Example 8 except that the inter-rib distance of the miniature ribs was 1.8 mm, and the miniature rib width was 0.10 mm. The contact probability was 5%.

Comparative Example 7

A separator was produced in the same manner as in Example 11 except that the base portion thickness was 0.27 mm.

Comparative Example 8

A separator was produced in the same manner as in Example 12 except that the inter-rib distance of the miniature ribs was 0.19 mm. The contact probability was 50%.

Comparative Example 9

A separator was produced in the same manner as in Example 11 except that the base portion thickness was 0.13 mm, and the main rib height was 0.37 mm to make a total thickness of 0.70 mm.

Subsequently, the separators of Examples 1 to 12 and Comparative Examples 1 to 9 obtained above were evaluated for various characteristics in the following manners. The results are shown in Table 1.

<Puncture Strength>

The separator was cut into 20 mm in length×15 mm in width along the flow direction of the microporous film to prepare a test piece. The test piece was held with a test piece fixture having a hole with a diameter of 6.68 mm, and punctured from the miniature rib surface corresponding to the region having no main rib formed, with a needle (iron bar) having a needle tip with a cylindrical shape having a diameter of 1.9 mm under condition of a velocity of 60 mm/min. The maximum load where the test piece was broken was designated as the puncture strength.

20 test pieces were measured, and the number of the test pieces exhibiting a strength of 10 N or more is shown in Table 1. The effect of suppressing puncture in assembling the battery was evaluated by A for the number of 10 or more, B for the number of 5 or more, and C for the number of less than 5. In the case where 5 or more of the test pieces have a strength of 10 N or more, the effect of suppressing puncture with a grating electrode in assembling the battery can be expected.

<Electric Resistance>

The separator was cut into a square size of 70 mm×70 mm to prepare a test piece. The test piece was measured for electric resistance with a tester according to SBA S 0402, as the standard defined by Battery Association of Japan. Table 1 shows the relative values based on the value of Example 1 as 100.

Assuming Example 1 as 100%, the case having a relative value within 110% was evaluated as passed.

<Oxidation Resistance Lifetime>

A positive electrode and a negative electrode formed of lead plates each having a square shape of 50 mm×50 mm with the separator cut into a square shape of 70 mm×70 mm intervening therebetween were stacked concentrically with the directions of the squares being conformed to each other. The electrode group including one positive electrode, one separator, and one negative electrode stacked was compressed at 19.6 kPa and installed in a battery jar. 1,000 mL of a diluted sulfuric acid electrolyte having a specific gravity of 1.300 (20 degrees) was charged therein, and a constant direct current of 5.0 A was applied at a solution temperature of 50±2° C. The electrifying time at the time when the terminal voltage became 2.6 V or less or the voltage difference became 0.2 V or more was measured and designated as the oxidation resistance time (h). Table 1 shows the relative values based on the value of Example 1 as 100.

Assuming Example 1 as 100%, the case having a relative value of 90% or more was evaluated as passed.

TABLE 1

| | Items | Unit | Example 1 | Example 2 | Example 3 | Example 4 | Example 5 | Comparative Example 1 |
|---|---|---|---|---|---|---|---|---|
| Shape | Total thickness | mm | 0.70 | 0.70 | 0.70 | 0.70 | 0.70 | 0.70 |
| | Base portion thickness | | 0.20 | 0.25 | 0.15 | 0.20 | 0.20 | 0.20 |
| | Main rib height | | 0.30 | 0.25 | 0.35 | 0.30 | 0.30 | 0.50 |
| Miniature ribs | Height | mm | 0.20 | 0.20 | 0.20 | 0.20 | 0.20 | — |
| | Width | mm | 0.10 | 0.10 | 0.10 | 0.10 | 0.20 | — |
| | Inter-rib distance of miniature ribs | mm | 0.53 | 0.53 | 0.53 | 0.53 | 1.06 | — |
| | Contact probability | % | 15 | 15 | 15 | 15 | 15 | 0 |
| | Linear direction of miniature ribs | — | — | — | — | perpendicular to Example 1 | — | — |
| Separator characteristics | Number of pieces having puncture strength of 10N or more | Piece | 20 | 20 | 18 | 20 | 20 | 0 |
| | Effect of suppressing puncture in assembling battery | — | A | A | A | A | A | C |
| | Electric resistance | % | 100 | 105 | 95 | 100 | 100 | 97 |
| | Oxidation resistance time | % | 100 | 110 | 90 | 100 | 100 | 100 |

| | Items | Unit | Comparative Example 2 | Comparative Example 3 | Example 6 | Example 7 | Example 8 | Example 9 |
|---|---|---|---|---|---|---|---|---|
| Shape | Total thickness | mm | 0.70 | 0.70 | 0.70 | 0.70 | 0.70 | 0.70 |
| | Base portion thickness | | 0.25 | 0.15 | 0.15 | 0.15 | 0.15 | 0.15 |
| | Main rib height | | 0.45 | 0.55 | 0.35 | 0.35 | 0.45 | 0.50 |
| Miniature ribs | Height | mm | — | — | 0.20 | 0.20 | 0.10 | 0.05 |
| | Width | mm | — | — | 0.20 | 0.20 | 0.20 | 0.20 |
| | Inter-rib distance of miniature ribs | mm | — | — | 1.70 | 1.70 | 1.70 | 1.70 |
| | Contact probability | % | 0 | 0 | 10 | 10 | 10 | 10 |
| | Linear direction of miniature ribs | — | — | — | — | perpendicular to Example 6 | — | — |
| Separator characteristics | Number of pieces having puncture strength of 10N or more | Piece | 3 | 0 | 13 | 12 | 9 | 5 |
| | Effect of suppressing puncture in assembling battery | — | C | C | A | A | B | B |
| | Electric resistance | % | 102 | 92 | 94 | 94 | 94 | 94 |
| | Oxidation resistance time | % | 110 | 90 | 90 | 90 | 90 | 90 |

| | Items | Unit | Comparative Example 4 | Comparative Example 5 | Comparative Example 6 | Example 10 | Example 11 |
|---|---|---|---|---|---|---|---|
| Shape | Total thickness | mm | 0.70 | 0.70 | 0.70 | 0.70 | 0.70 |
| | Base portion thickness | | 0.15 | 0.13 | 0.15 | 0.20 | 0.25 |
| | Main rib height | | 0.53 | 0.52 | 0.45 | 0.30 | 0.25 |
| Miniature ribs | Height | mm | 0.02 | 0.05 | 0.10 | 0.20 | 0.20 |
| | Width | mm | 0.20 | 0.20 | 0.10 | 0.20 | 0.20 |
| | Inter-rib distance of miniature ribs | mm | 1.70 | 1.70 | 1.80 | 0.44 | 0.44 |
| | Contact probability | % | 10 | 10 | 5 | 30 | 30 |
| | Linear direction of miniature ribs | — | — | — | — | — | — |

TABLE 1-continued

| Separator characteristics | Number of pieces having puncture strength of 10N or more | Piece | 1 | 0 | 1 | 20 | 20 |
|---|---|---|---|---|---|---|---|
| | Effect of suppressing puncture in assembling battery | — | C | C | C | A | A |
| | Electric resistance | % | 94 | 92 | 93 | 104 | 109 |
| | Oxidation resistance time | % | 90 | 85 | 90 | 100 | 110 |

| | Items | Unit | Example 12 | Comparative Example 7 | Comparative Example 8 | Comparative Example 9 |
|---|---|---|---|---|---|---|
| Shape | Total thickness | mm | 0.70 | 0.72 | 0.70 | 0.70 |
| | Base portion thickness | | 0.15 | 0.27 | 0.15 | 0.13 |
| | Main rib height | | 0.35 | 0.25 | 0.35 | 0.37 |
| Miniature ribs | Height | mm | 0.20 | 0.20 | 0.20 | 0.20 |
| | Width | mm | 0.20 | 0.20 | 0.20 | 0.20 |
| | Inter-rib distance of miniature ribs | mm | 0.44 | 0.44 | 0.19 | 0.44 |
| | Contact probability | % | 30 | 30 | 50 | 30 |
| | Linear direction of miniature ribs | — | — | — | — | — |
| Separator characteristics | Number of pieces having puncture strength of 10N or more | Piece | 20 | 20 | 20 | 16 |
| | Effect of suppressing puncture in assembling battery | — | A | A | A | A |
| | Electric resistance | % | 99 | 113 | 111 | 97 |
| | Oxidation resistance time | % | 90 | — | — | 85 |

The following matters were found from the results shown in Table 1.

(1) As shown in Examples 1 to 3, the number of pieces having a puncture strength of 10 N or more was enhanced to 18 or more by providing the miniature ribs to make a contact probability of 15% as understood from the comparison to Comparative Examples 1 to 3 having no miniature rib. Accordingly, the miniature ribs provided enhance the puncture strength, and the effect of suppressing puncture can be expected.

(2) Example 4 had the miniature ribs having a linear direction perpendicular to the flow direction of the sheet, and was confirmed to exhibit the enhancement of the puncture strength equivalent to Example 1. Example 7 was similarly confirmed to exhibit the enhancement of the puncture strength equivalent to Example 6. Accordingly, it was confirmed that the puncture strength did not depend on the linear direction of the miniature ribs.

(3) Example 5 had a larger miniature rib width and a larger inter-rib distance of the miniature ribs than Example 1, but was confirmed to exhibit the enhancement of the puncture strength equivalent to Example 1 since the contact probability of Example 5 was equivalent to that of Example 1. Accordingly, it was confirmed that the enhancement of the puncture strength (i.e., the effect of suppressing puncture) depended on the contact probability.

(4) Example 6 had a larger miniature rib width than Example 3, but the contact probability thereof was decreased to 10% from 15% for Example 3 due to the large inter-rib distance of the miniature ribs. However, the number of test pieces having a strength of 10 N or more was 13 or more in the evaluation of puncture strength, and thus the enhancement of the puncture strength due to the provided miniature ribs was confirmed as compared to Comparative Example 3.

(5) Examples 8 and 9 had a contact probability of 10%, and the enhancement of the puncture strength by the miniature ribs was confirmed as compared to Comparative Example 3 even in the case where the height of the miniature ribs was lower than that in Example 6. However, the needle tip was close to the base portion due to the decrease of the miniature rib height as compared to Example 6, and the puncture strength was lowered in some of the test pieces.

(6) Examples 10 to 12 had a contact probability of 30% and thus exhibited the stable enhancement of the puncture strength with the base portion thickness in a range of from 0.15 mm to 0.25 mm. On the other hand, the increase of the electric resistance was observed in some of the test pieces due to the increase of the base portion thickness, but was in the allowable range.

(7) Comparative Example 4 retained a contact probability of 10% but had a lower miniature rib height of 0.02 mm than Example 6, and thus the needle tip was close to the vicinity of the base portion. Accordingly, the enhancement of the puncture strength was not observed.

(8) Comparative Example 5 retained a contact probability of 10%. However, the decrease of the puncture strength of the base portion caused by the base portion thickness of 0.13 mm and the improvement effect by the miniature ribs were cancelled out by each other. Accordingly, the puncture strength was lowered as compared to Example 9. The decrease of the oxidation resistance time was observed due to the thinning of the base portion thickness.

(9) Comparative Example 6 had a contact probability of 5%, and thus the effect of improving the puncture strength by the miniature ribs was not sufficiently obtained as compared to Example 8.

(10) Comparative Example 7 had a contact probability of 30% and thus exhibited a good puncture strength similarly to Example 11. However, the increase of the electric resistance was observed due to the influence of the increase of the base portion thickness to 0.27 mm.

(11) Comparative Example 8 had an increased contact probability of 50%, and as a result, the impregnation with the electrolyte became insufficient as compared to Example 12, resulting in the increase of the electric resistance.

(12) Comparative Example 9 had a contact probability of 30%, and thus the improving effect against puncture was observed irrespective of the base portion thickness of 0.13 mm. However, the oxidation resistance lifetime was lowered since the small resin amount due to the thin base portion as compared to Example 11.

REFERENCE SIGN LIST 1 electrode plate
2 separator for lead acid storage battery (separator)
2a main rib
2b miniature rib
3 base portion
3a main rib surface
3b miniature rib surface
5 lead bar
5a edge portion
10 needle
10a tip surface
101 electrode plate
102 separator
105 lead bar

The invention claimed is:

1. A separator for a lead acid storage battery, comprising:
a microporous film having a thickness of from 0.1 to 0.3 mm as a base portion;
plural main ribs that are provided on one surface of the base portion; and
plural miniature ribs that have a lower height than a height of the main ribs and are provided on the other surface of the base portion for contacting a lead portion of an electrode plate,
the plural miniature ribs being provided in a linear form with an inter-rib distance, which is a distance between facing surfaces of the adjacent miniature ribs, of less than 1.9 mm,
wherein the miniature ribs have an inclination to the flow direction of the sheet, the inclination angle being 30° or less.

2. The separator for a lead acid storage battery according to claim 1, wherein in a case where a contact width of a tip surface having a diameter of 1.9 mm of a needle to the miniature rib in a cross section perpendicular to the linear direction of the miniature rib is changed while repeatedly increasing and decreasing at a constant cycle by perpendicularly touching the miniature rib of the other surface with the tip surface of the needle and moving the needle along a direction of the inter-rib distance, a probability of contacting the tip surface of the needle with the miniature rib is 10% or more and 30% or less, and
the probability is determined from a ratio of a width of the miniature rib that is brought into contact with the needle to a width of the tip surface of the needle while the needle moves for one cycle of the cycle.

3. The separator for a lead acid storage battery according to claim 1, wherein the miniature ribs have a miniature rib height of from 0.05 to 0.20 mm.

4. The separator for a lead acid storage battery according to claim 1, wherein the base portion has a thickness of from 0.15 to 0.25 mm.

5. The separator for a lead acid storage battery according to claim 1, wherein the miniature ribs are provided in a linear form in a direction in parallel to a flow direction of a sheet in compression molding in production of the microporous film.

* * * * *